Dec. 22, 1953  E. HARROW  2,663,060
COLLAR FASTENER AND TIE CLASP
Filed April 15, 1950  2 Sheets-Sheet 1
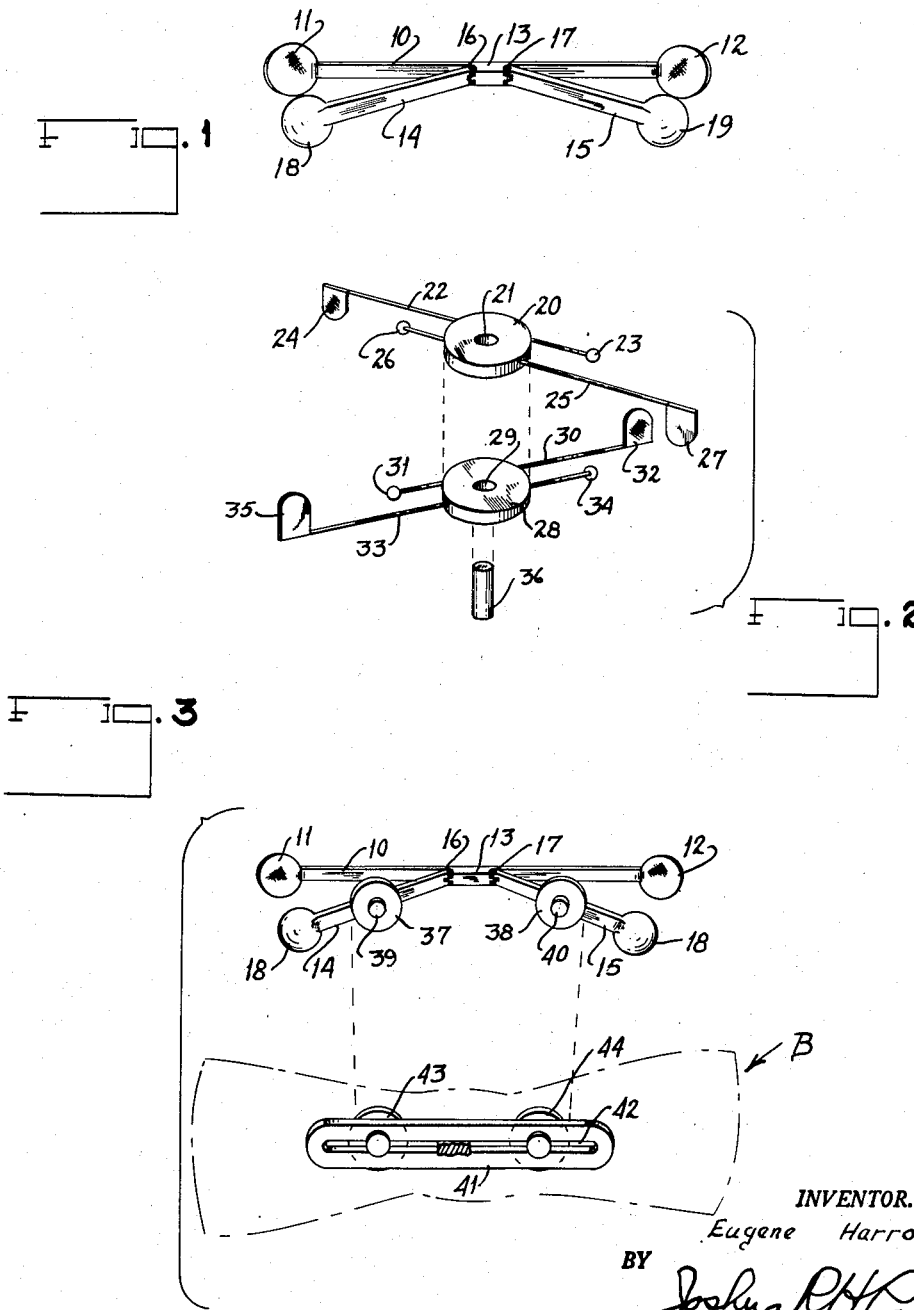
INVENTOR.
Eugene Harrow
BY Joshua R. H. Potts
His Attorney Dec. 22, 1953   E. HARROW   2,663,060
COLLAR FASTENER AND TIE CLASP
Filed April 15, 1950   2 Sheets-Sheet 2
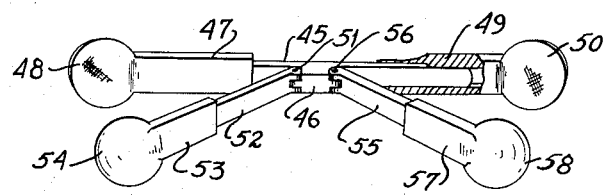
Fig. 4
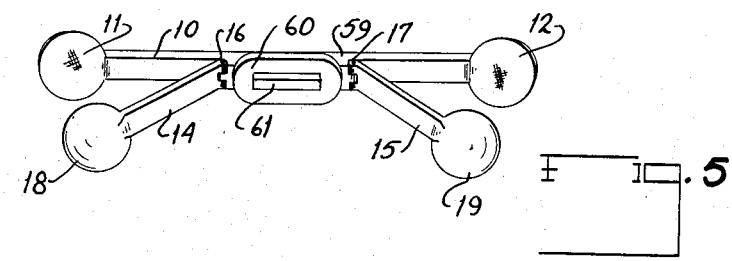
Fig. 5
Fig. 6
INVENTOR.
Eugene Harrow
BY
Joshua R. H. Potts
His Attorney Patented Dec. 22, 1953

2,663,060

UNITED STATES PATENT OFFICE 2,663,060

COLLAR FASTENER AND TIE CLASP

Eugene Harrow, Philadelphia, Pa., assignor of forty per cent to George N. Calhoun, Philadelphia, Pa.

Application April 15, 1950, Serial No. 156,130

2 Claims. (Cl. 24—49)

The present invention relates to collar fasteners such as are commonly employed in conjunction with the collars of shirts and such fasteners as are combined with clasps for pre-tied ties.

The present invention has in view as its foremost objective the provision of a collar fastener in which the attaching or holding functions are performed by magnetic forces. Ordinarily a collar fastener includes means for grippingly engaging each of the confronting edges of a collar. In accordance with the present invention, each of these means includes as an essential element a permanent magnet, together with an armature which cooperates therewith.

The permanent magnet and the armature grip a side of the collar therebetween.

In providing a collar fastener in accordance with the above-noted object, an inner bar is provided which is intended to extend across the gap in the collar with its end portions disposed beneath the outer flaps of the collar. This bar is preferably a permanent magnet and has its outer ends enlarged to provide increased magnetic forces where the holding functions are performed.

Hingedly mounted on this bar, centrally thereof, are a pair of clasp elements, each of which extends outwardly so as to engage over the outer face of the collar flap. Each of these clasp elements is of a material having good magnetic permeability and also preferably has its ends enlarged where the holding functions are required. It is evident that each end of each clasp element cooperates with an end of the bar to grippingly engage a flap of the collar.

Another highly important object of the invention is to provide a magnetic collar fastener of the type indicated which is adjustable to vary the effective position of the parts which perform the collar gripping functions. In carrying out this idea two rods are adjustably mounted in a hub member and each carries at its outer end a magnetic element.

A second pair of rods are adjustably mounted in a hub member and carry at their outer ends magnetic elements complemental to the magnetic elements in the first member. The two hub members are pivotally connected together so as to permit movement of the magnetic elements toward and away from one another.

Another object of the invention is to provide a magnetic collar fastener of the type above indicated, in which the adjustment is obtained by forming each clasp element for each collar flap as a pair of telescopic sections. Thus, each section may be adjusted to accommodate application to any particular collar.

In many instances collar fasteners of the type above indicated are also employed to support in position a pre-tied tie, such as a bow tie or a pre-tied cravat. Thus, a further highly important object of the invention is to provide a magnetic collar fastener of the type indicated, with means for detachably securing a pre-tied tie thereto. This attaching means in itself may either be purely mechanical or may also include magnetic fastening devices.

In one form of the invention each clasp element is provided with an element of a fastening device. The tie which is secured thereto carries complemental elements of the fastening devices so that the tie may be secured to the clasp elements.

In another form the collar fastener is provided with one element of a magnetic fastener between the clasp elements. The tie is provided with a complemental element of this magnetic fastener and the two elements of this magnetic fastener are designed to interlock so as to securely attach the tie to the collar fastener between the clasp elements thereof.

Various other more detailed objects and advantages of the invention, such as arise in connection with carrying out the above-noted ideas in a practical embodiment, will in part become apparent and in part be hereinafter stated as the description of the invention proceeds.

The invention therefore comprises a collar fastener in which the means which grippingly engage the collar flaps are magnetic devices, with the collar fastener being provided with means for detachably securing a pre-tied tie thereto.

For a full and more complete understanding of the invention, reference may be had to the following description and accompanying drawings, wherein:

Figure 1 is a perspective view of a magnetic collar fastener designed in accordance with the precepts of this invention;

Figure 2 is a perspective view showing the elements of a modified form in exploded relation;

Figure 3 is another perspective view showing the collar fastener provided with means for attaching a pre-tied tie thereto. This view shows the pre-tied tie in broken outline with the attaching device in exploded relation relative to the collar fastener;

Figure 4 is a perspective view of another modification;

Figure 5 is a perspective view of still another modification; and

Figure 6 is a perspective view showing a pre-tied tie in broken outline and the attaching device therefor in perspective.

Referring now to the drawings wherein like characters of reference denote corresponding parts, and first more particularly to Figure 1, a collar fastener which is designed in accordance with the precepts of this invention is shown as comprising a main cross bar 10 having enlarged tabs 11 and 12 at the opposite ends thereof. The bar 10 together with the tabs 11 and 12 may be a permanent magnet throughout or the bar 10 may be of nonmagnetic material with the tabs 11 and 12 individual permanent magnets. In either case, the bar 10 is formed with a central portion 13 of increased thickness to which is pivotally attached a pair of clasp elements 14 and 15. The clasp element 14 is secured to the thickened portion 13 by a pin 16, while the clasp element 15 is secured to the thickened portion 13 by another pin 17. Clasp element 14 carries an enlarged tab 18 at its outer free end which is disposed opposite to the tab 11, and the clasp element 15 carries another enlarged tab 19 at its outer free end which is disposed opposite to the tab 12.

Each of the clasp elements 14 and 15, together with the tabs at the ends thereof, may be of a material having good magnetic permeability throughout, or the clasp elements 14 and 15 may be of a non-magnetic material such as plastic with only the enlarged tabs 18 and 19 of a material having good magnetic permeability.

In any event, the tabs 11 and 18 are intended to be attracted to one another to secure a collar flap therebetween, while the tabs 12 and 19 are intended to be attracted in a similar manner.

It is evident that the bar 10 may be positioned to bridge the gap across the collar with the portion 13 located centrally thereof. The tabs 11 and 18 grippingly engage the collar flap on one side, and the tabs 12 and 19, the collar flap on the other side.

*First modification*

In Figure 2 there is illustrated a modified form of the invention which is peculiarly adapted for adjustment as to the effective length of the fastener. In this form a hub member 20 is shown with its diametrical dimension somewhat exaggerated. This hub element is formed with a central opening 21 and a pair of transverse passages on the opposite sides of the opening.

Extending through one of these passages is a rod 22 having an enlargement 23 on its inner end and carrying a magnetic element 24 on its opposite end. A second rod 25 passes through the other of the passages and has an enlargement 26 on one end and a magnetic element 27 on its opposite end.

Obviously, the rods 22 and 25 are maintained assembled on the hub element 20 by the enlargements 23 and 26 and the magnetic elements 24 and 27. They may be slid back and forth in their respective passages to adjust the distance between the magnetic elements 24 and 27.

A second hub member 28 has a central opening 29 and is formed with passages on either side thereof. Slidingly received in one of these passages is a rod 30 having an enlargement 31 on one end and carrying a magnetic element 32 on the other end. Slidingly received in the other passage is a rod 33 having an enlargement 34 on one end and a magnetic element 35 on the other end.

In using the collar fastener of Figure 2, the magnetic elements 27 and 32 are intended to cooperate in securing a collar flap therebetween. Thus, one or both of these elements is a permanent magnet, with the other element either an armature for that permanent magnet or a permanent magnet with its polarity properly related to that of the other permanent magnet to provide for the attraction of the magnetic elements 27 and 32. Likewise, the magnetic elements 24 and 35 are intended to cooperate to clamp a collar flap therebetween. One or both of these elements is a permanent magnet, as above mentioned, with the other an armature therefor.

A pivot pin 36 passes through the openings 21 and 29 to rotatably connect the hub members 20 and 28. It will be noted that the inner or meeting faces of the magnetic elements 24, 27, 32 and 35 are roughened to provide for a good frictional nonslip engagement with the faces of the collar flaps.

In use, the rods 22 and 25 are adjusted to provide a proper distance between the magnetic elements 24 and 27 and the rods 30 and 33 are adjusted to provide a corresponding distance between the magnetic elements 32 and 35.

*Second modification*

Referring more particularly to Figure 3, another modified form of the invention is therein illustrated. In this form a magnetic collar fastener which includes all of the elements described above in connection with Figure 1 is employed. These parts are given the same reference characters employed in Figure 1.

Mounted on the clasp arm 14 is an element 37 of a magnetic fastener, while mounted on the clasp arm 15 is another element 38 of a magnetic fastener. The element 37 is formed with a projection 39, and the element 38 with a projection 40. A pre-tied tie such as a bow tie is depicted in broken outline and is referred to in its entirety by the reference character B. Secured to this tie in any preferred manner, such as by stitching, is a bar 41 formed with a slot 42. Adjustably mounted in the slot 42 are a pair of magnetic fastening elements 43 and 44. The magnetic element 43 is complemental to the magnetic element 37, and the magnetic element 44 is complemental to the magnetic element 38. Each of the elements 43 and 44 is formed with a recess or depression which receives one of the projections 39 or 40 to establish an interlock between the elements of each magnetic fastener.

It is evident that the fastening device may be applied to the collar in the manner above described in connection with Figure 1. The bow tie B is then attached to the fastening device by properly adjusting the positions of the elements 43 and 44 so that they will correspond to the spacing between the elements 37 and 38. They are then secured thereto. One of the elements 37 or 43 is a permanent magnet, with the other an armature therefor, and one of the elements 38 or 44 is a permanent magnet with the other an armature therefor, or two permanent magnets may be employed in each pair with their polarity suitably arranged to provide for the necessary attraction.

*Third modification*

Referring now more particularly to Figure 4, another arrangement for providing adjustment in the effective length of the collar fastener will be described. The collar fastener therein illustrated is shown as comprising an inner bar 45 which preferably is of a non-magnetic material and which has a central thickened portion 46. Telescopically secured on one end of the bar 45 is an outer section 47 having an enlarged tab 48 on its outer free end and which is either a permanent magnet or of a material having a good magnetic permeability. Telescopically mounted on the other end of the bar 45 is another outer section 49 having an enlarged tab 50 on its outer end. The section 49, together with the tab 50, is either a permanent magnet or of a material having good magnetic permeability.

Hingedly secured to the thickened portion 46 by a hinge pin 51 is an inner section 52 of a clasp arm. Telescopically mounted on this inner section 52 is an outer clasp arm 53 having an enlarged tab 54 on the outer end thereof. The inner section 52 is preferably of nonmagnetic material, while the outer section 53 together with the tab 54 is either a permanent magnet or of a material having good magnetic permeability. One or both of the tabs 48 and 54 is a permanent magnet with the other either an armature therefor or a permanent magnet having its polarity arranged with respect to the other permanent magnet so as to provide for attraction between the two.

Another inner clasp arm section 55 is hingedly mounted by a pin 56 on the thickened portion 46. Telescopically mounted on the inner section 55 is an outer section 57 having an enlarged tab 58 at its outer end. The inner section 55 is preferably of non-magnetic material, with the outer section 57 and the tab 58 either a permanent magnet or of material having good magnetic permeability. One or both of the tabs 50 and 58 should be a permanent magnet with the other either an armature therefor or a permanent magnet having its polarity suitably arranged to provide for attraction between the two.

In use, the tabs 48 and 54 grippingly engage one flap of the collar, while the tabs 50 and 58 grippingly engage the other flap. The distance between each pair of tabs may be suitably adjusted by sliding the sections 47 and 53 on the bars 45 and 52 on one side, and sliding the sections 49 and 57 on the bars 45 and 55 on the other side.

*Fourth modification*

Figures 5 and 6 illustrate a different arrangement, which provides for the attachment of a pre-tied tie thereto. In this form of the invention the collar fastener is substantially the same as that illustrated and described in connection with Figure 1, with the exception that the central thickened portion 13 is replaced by a central thickened portion 59 of greater extent. Mounted on one face of this central portion 59 is an element 60 of a magnetic fastener. This element 60 is formed with a projection 61 that is elongated and partakes of the characteristics of a bar.

The pre-tied tie is depicted by the broken outline and is designated B1. Secured to this tie in any appropriate manner is a magnetic fastening element 62 which is complemental to the magnetic element 60. This element 60 is formed with an elongated slot 63 that is adapted to snugly receive the bar 61 to provide an interlock between the two elements of the magnetic fastener. One or both of the members 60 and 62 may be a permanent magnet with the other an armature therefor. If they are both permanent magnets their polarity is suitably arranged for providing for an attraction between the elements 60 and 62.

In use, the collar fastener is applied to the collar in the manner above described. The bow tie B1 is then attached to the fastener by causing the element 62 to be attached to the element 60 with a bar 61 interlocking the slot 63.

While preferred specific embodiments of the invention are hereinbefore set forth, it is to be clearly understood that the invention is not to be limited to the exact materials, mechanisms and devices illustrated and described because various modifications of these details may be provided in putting the invention into practice within the purview of the appended claims.

What is claimed is:

1. In a magnetic collar fastener, a bar having a central embossment and formed with a magnetic element at each end thereof, a pair of clasp arms each of which is hingedly connected to said bar at said embossment, a magnetic element on the free end of each clasp arm, the magnetic elements on one end of said bar and the end of the clasp arm located thereat being complemental, with one of them a permanent magnet and the other an armature therefor, and an elongated projection on said central embossment, a pre-tied tie having a plate formed with a slot adapted to receive said projection, said projection and said plate being complemental magnetic elements with one of them a permanent magnet and the other an armature therefor.

2. In a magnetic collar fastener, a bar having a central embossment and formed with a magnetic element at each end thereof, a pair of clasp arms each of which is hingedly connected to said bar at said embossment, a magnetic element on the free end of each clasp arm, the magnetic elements on one end of said bar and the end of the clasp arm located thereat being complemental, with one of them a permanent magnet and the other an armature therefor, a permanent magnet secured to said central embossment and formed with an elongated projection, a pre-tied tie, and an armature for said permanent magnet secured to said tie and having a slot adapted to receive said projection.

EUGENE HARROW.

References Cited in the file of this patent

UNITED STATES PATENTS

| Number | Name | Date |
|---|---|---|
| 184,789 | Lynch | Nov. 28, 1876 |
| 905,705 | Johnson | Dec. 1, 1908 |
| 1,419,683 | Minor | June 13, 1922 |
| 1,509,444 | Pithouse | Sept. 23, 1924 |
| 1,821,446 | Paulson | Sept. 1, 1931 |
| 1,996,024 | Mix | Mar. 26, 1935 |
| 2,071,181 | Smith | Feb. 18, 1937 |
| 2,120,070 | Huellebrand | June 7, 1938 |
| 2,150,020 | Carlson | Mar. 7, 1939 |
| 2,288,688 | Dubilier | July 7, 1942 |
| 2,397,931 | Ellis | Apr. 9, 1946 |

FOREIGN PATENTS

| Number | Country | Date |
|---|---|---|
| 12,047 | Great Britain | of 1902 |